(12) United States Patent
Cheng

(10) Patent No.: US 11,120,651 B2
(45) Date of Patent: Sep. 14, 2021

(54) METHOD AND SYSTEM OF RECORDING DATA FROM BORESCOPIC INSPECTION

(71) Applicant: Lin Cheng, Guangdong (CN)

(72) Inventor: Lin Cheng, Guangdong (CN)

( * ) Notice: Subject to any disclaimer, the term of this patent is extended or adjusted under 35 U.S.C. 154(b) by 341 days.

(21) Appl. No.: 16/063,966

(22) PCT Filed: Dec. 5, 2017

(86) PCT No.: PCT/CN2017/114583
§ 371 (c)(1),
(2) Date: Jun. 19, 2018

(87) PCT Pub. No.: WO2019/109241
PCT Pub. Date: Jun. 13, 2019

(65) Prior Publication Data
US 2019/0172277 A1     Jun. 6, 2019

(51) Int. Cl.
*G07C 5/08* (2006.01)
*G06F 16/22* (2019.01)
(Continued)

(52) U.S. Cl.
CPC .............. *G07C 5/0866* (2013.01); *B64F 5/60* (2017.01); *G02B 23/2484* (2013.01);
(Continued)

(58) Field of Classification Search
CPC .. G07C 5/08; G07C 5/00; G06F 16/22; B64F 5/60
See application file for complete search history.

(56) References Cited

U.S. PATENT DOCUMENTS

2002/0123915 A1   9/2002  Denning et al.
2007/0226258 A1*  9/2007  Lambdin .............. G02B 23/26
(Continued)

FOREIGN PATENT DOCUMENTS

CN       101178385 A       5/2008
CN       102288412 A      12/2011

OTHER PUBLICATIONS

Xu, Wenjun, "Research on Aeroengine Borescopic Detection Damage Assessment System." Master's Thesis, China Civil Aviation University, Feb. 2007.
(Continued)

*Primary Examiner* — Kira Nguyen
(74) *Attorney, Agent, or Firm* — United IP Counselors, LLC

(57) ABSTRACT

The present invention provides a method and a system for recording data from the borescopic inspection meaning checking whether defects occur in equipment consists of components with a borescope, the method comprising: (1) constructing the hierarchical structure of components in the equipment; the hierarchical structures of components include two levels of Module and Part, the Module comprising one or more Part(s); (2) defining the general description template of the defects; (3) defining the evaluation template for the inspection results of the Part(s); (4) defining the conclusion template of defects on Module; (5) standardizing input of data from the borescopic inspection; (6) concluding based on data from the borescopic inspection. According to the present invention, it provides an excellent measurement method for improving the reliability of modular mechanical products through quantizing the overall trend of internal defects.

19 Claims, 5 Drawing Sheets

(51) Int. Cl.
    *B64F 5/60*      (2017.01)
    *G07C 5/00*      (2006.01)
    *G02B 23/24*     (2006.01)
(52) U.S. Cl.
    CPC .............. *G06F 16/22* (2019.01); *G07C 5/008* (2013.01); *G07C 5/0808* (2013.01); *G07C 2205/02* (2013.01)

(56) References Cited

U.S. PATENT DOCUMENTS

| | | | | |
|---|---|---|---|---|
| 2012/0026306 | A1* | 2/2012 | Mitra | H04N 7/18 348/61 |
| 2012/0221569 | A1* | 8/2012 | Sato | G16H 40/40 707/736 |
| 2013/0345502 | A1* | 12/2013 | Mitsunaga | G11B 27/105 600/103 |
| 2014/0139658 | A1* | 5/2014 | Dhanvantri | H04L 67/025 348/85 |
| 2015/0100201 | A1* | 4/2015 | Alexandre | G06Q 30/0633 701/33.2 |
| 2015/0350553 | A1* | 12/2015 | Jana | G05B 19/042 348/82 |

OTHER PUBLICATIONS

International Search Report issued in International Application No. PCT/CN2017/114583 dated May 12, 2017.

* cited by examiner

| Module: HPC |
|---|
| Record 1: HPC>HPC BLADES> STAGE 4 HPC BLADES>NICK |

Nick

| Position: | LEADING EDGE , TIP CORNER |
|---|---|
| | FROM TIP: 2.70 MM |
| | FROM PLATFORM:    MM |
| Dimension: | MAX DEPTH: 0.38 MM |
| | THE WIDTH:    MM |
| | DAMAGE BLADES:   1 EA |
| | DEFECTS ON THE BLADE:   EA |

Result:       Accept with No Further Action Required

RCMD:        800Cycles/       Hours            Trend: The Same

Reference:    AMM72-00-00/601    Revision:63

Page 625 (j) Tears, nicks, dents, missing material and erosion at the leading and trailing edge tip corners in Dim. A of stages 1 thru 4 compressor blades. 1) No maximum number of tears, nicks and dents if the defect is less than 0.25 inch (6.4 mm) in depth.

Remarks:

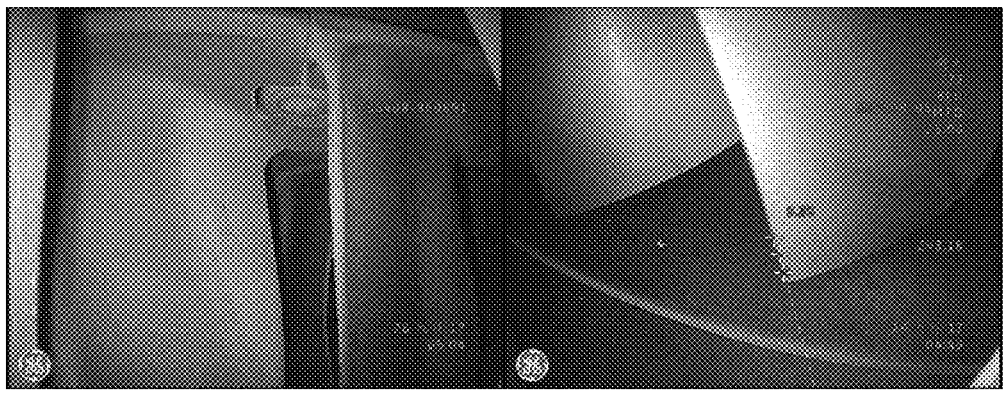

FIG.3

| Defects | Chinese Descriptions |
|---|---|
| Normal | 没有损伤，检查结果正常 |
| Crack | 裂纹 |
| Missing Material | 材料丢失 |
| Nick | 缺口 |
| Dent | 凹痕 |
| Scratch | 划痕 |
| Tear | 撕裂 |
| Curl | 卷曲 |
| Bend | 弯曲 |
| Erosion | 腐蚀 |

| 项目 | 损伤名称（英文） | 损伤名称（中文） |
|---|---|---|
| 1 | ABRASION | 磨损 |
| 2 | BEND | 弯曲 |
| 3 | BLISTERING | 起泡 |
| 4 | BLOCKED | 被堵塞 |
| 5 | BROKEN | 破碎 |
| 6 | BULGE | 凸起 |
| 7 | BURN | 烧蚀 |
| 8 | BURN THROUGH | 烧穿 |
| 9 | BURNBACK | 边缘烧蚀 |
| 10 | BURNISHING | 被磨亮 |
| 11 | BURR | 毛刺 |
| 12 | BUSH MISSING | 衬套丢失 |
| 13 | CLEARANCE | 间隙 |
| 14 | COATING MISSING | 涂层丢失 |
| 15 | COKING | 焦化 |
| 16 | CORROSION | 腐蚀 |
| 17 | CRACK | 裂纹 |
| 18 | CURL | 卷曲 |
| 19 | DEBRIS | 碎屑 |
| 20 | DENT | 凹痕 |
| 21 | DISCOLORATION | 变色褪色 |
| 22 | DISTORTION | 扭曲 |
| 23 | FOREIGN OBJECT DAMAGE | 外来物损伤 |
| 24 | LIFT UP | 被拉起 |
| 25 | LINER DETACHMENT | 涂层分离 |
| 26 | LOOSE | 松动 |
| 27 | MARKS | 有痕迹 |
| 28 | MECHANISM DEFECT | 机械原因导致的损伤 |
| 29 | MISSING | 丢失 |
| 30 | MISSING MATERIAL | 材料丢失 |
| 31 | NICK | 缺口 |
| 32 | NOTCH | 缺口（尤指V形槽） |
| 33 | OUT OF FLUSH | 不对齐 |
| 34 | OXIDATION | 氧化 |
| 35 | RIVETS LOOSED | 铆钉松动 |
| 36 | RIVETS MISSING | 铆钉丢失 |
| 37 | RIVETS PULLED | 铆钉被拉起 |
| 38 | ROTATED | 旋转 |
| 39 | RUB | 摩擦 |
| 40 | RUBBING | 印记 |
| 41 | SCORE | 痕迹 |
| 42 | SCRATCH | 划痕 |
| 43 | SEAL DETACHED | 封圈分离 |
| 44 | SHARP EDGES AND RAISED MATERIAL | 材料锐边及凸起 |

| 45 | SHINGLING | 搭接 |
| 46 | STAINS | 污渍 |
| 47 | SULPHIDATION | 硫化 |
| 48 | TEAR | 撕裂 |
| 49 | TIP BURRS | 叶尖毛刺 |
| 50 | UNLATCHED | 脱开 |
| 51 | WEAR | 磨损 |

FIG.5 (CONTINUED)

METHOD AND SYSTEM OF RECORDING DATA FROM BORESCOPIC INSPECTION

BACKGROUND

Field of the Application

The present invention relates to the field of data processing, especially relates to a method and a system of recording data from the borescopic inspection.

Background of the Application

The aircraft engine is a highly sophisticated and precise thermal mechanism, which provides the aircraft with the power required for flight. The modern aircraft engine pursues high power-weight ratio, high pressure ratio and the gas temperature before high pressure turbine is getting higher and higher; as the engine, especially the hot section, works in a high-temperature, high-pressure and high-load environment, defects to Parts in the engine and situations of the defect extension will directly influence the safety and reliability of the plane.

The industrial borescope is the most effective tool to inspect engine's inner defects and the amount of Engine Removal identified by the industrial borescope accounts for over 60% of the total Engine Removal. According to the requirements from the airworthiness authority, the inspection results, the discovered defects and the subsequent measurements should be recorded after the borescopic inspection on the engine by using the industrial borescope is finished. At present, the borescopic inspection is commonly composed with Word or Excel and stored in a PDF document form within the industry. As the report forms of the borescopic inspection composed by workers varies with an individual and present strong subjectivity, which causes that the defect description and the intervals of the repetitive inspection of the borescope are not detailed enough and the accuracy of the measured data is not high, often it is merely used for recording and archiving. As this storage method fails to study the inspection results through a computer and analyze the trend of defects to the engine, which causes too many Aircraft On Ground (AOG) and Unscheduled Engine Removal (UER), the ratio of UER thereof is high, it will bring about hidden dangers to the operation and flight of the aircraft corporation.

SUMMARY

Application Object

The present invention aims to provide a method and a system of recording data from the borescopic inspection.

Technical Solution

In order to realize the above-mentioned purpose, the present invention provides the following technical solution:

A method for recording data from the borescopic inspection meaning checking whether defects occur in equipment consisting of components with a borescope, comprising:

(1) constructing a hierarchical structure of components in the equipment; wherein the hierarchical structure of components comprises two levels of Module and Part, and the Module comprises one or more Part(s);

(2) defining a general description template of the defects;

(3) defining an evaluation template for inspection results of the Part(s);

(4) defining a conclusion template of the defects on the Module;

(5) standardizing input of the data from the borescopic inspection;

(6) concluding based on the data from the borescopic inspection.

In a further step, in the above-mentioned method, the defining the general description template of defects comprises: defining the defects that may occur on the Part(s); and defining the general description template.

In a further step, in the above-mentioned method, the general description template comprises three sections of Type, Position and Size, wherein the Type means defining the defects, the Position means determining positions where the defects occur on the Part(s), and the Size means defining dimensions of the defects.

In a further step, in the above-mentioned method, the Type means defining the defects in a manner of Primary Type, Secondary Type and Remark, wherein Primary Type includes different subtypes.

In a further step, in the above-mentioned method, the Position means determining the positions where the defects occur on the Part(s) in a manner of Position 1-Position 2-Location.

In a further step, in the above-mentioned method, the evaluation template includes inspection results, recommendations and trend of defects.

In a further step, in the above-mentioned method, the inspection results of defects comprise:

A: no further actions are required as the defects occurring on the Part(s) are in a low level;

B: repetitive inspection standard identical to those of the last borescopic inspection is adopted as the defects occurring on the Part(s) do not prominently deteriorate compared with results of the last borescopic inspection and standard of shortening the borescopic inspection is not yet met;

C: interval of the repetitive borescope inspection needs to be shortened as the defects occurring on the Part(s) further deteriorate compared to the defects of the last borescopic inspection;

D: the equipment needs to be removed within a stipulated time as serious defects occur on the Part(s) and dimensions of the defects meet the equipment removal standard;

E: the equipment needs to be removed immediately as more serious defects occur on the Part(s) and go beyond the permitted dimension scope of the defects;

F: the inspection results are underdetermined and need to be further determined with the manufacturer of the equipment as defects occurring on the Part(s) are complicated and a corresponding conclusion cannot be made according to current existing standards.

In a further step, in the above-mentioned method, the recommendations comprise Flight hours/cycles before the next repetitive inspection and hours/cycles of Continue In Service.

In a further step, in the above-mentioned method, the trend of defects comprises: New Finding, The Same and Propagated.

In a further step, in the above-mentioned method, the evaluation template further comprises Reference and Remarks.

In a further step, in the above-mentioned method, the defining the conclusion template of defects on Module comprises: defining primary types of defects to be concluded, defining the subtypes of the defects and defining dimensions of the defects.

In a further step, in the above-mentioned method, the data from the borescopic inspection input by standardization comprise:

following information of one Part:
1) information input into the general description template;
2) information input into the evaluation template; and
3) information input into the conclusion template of defects on Modules; following information of another Part:
1) information input into the general description template;
2) information input into the evaluation template; and
3) information input into the conclusion template of defects on Modules;

until finishing input of information of borescopic inspection on all the Parts.

In a further step, in the above-mentioned method, when the equipment is an aircraft engine or a gas turbine, the data from the borescopic inspection input by standardization further comprise:

basic information of the engine;
information of engine ID plate.

In a further step, in the above-mentioned method, an inspection result of the Module automatically presents as normal for all Parts within the Module whose inspection results are normal;

Parts whose inspection results are C, D, E and F are automatically added to the conclusion;

Parts whose inspection results are A and B are added or not added to the conclusion.

In a further step, in the above-mentioned method, the method further comprises data calibration comprising, comparing the recorded basic information, Parts and defects of the engine with the historical data from the database;

if record informations of the defects on the Parts within the engine does not exist in the database after search, the present inspection record is directly stored in the database;

if description of the defects on the Parts within the engine already exists in the database after search, the input page will remind an input worker of results of the last borescopic inspection of the defects on the Parts, and the input worker can click to check the details of the last borescopic inspection so as to make a better assessment on the defects;

if record information of the defects on the Parts within the engine already exists in the database after search, the present record and the historical record should be calibrated, wherein the description of the defects cannot be submitted if the calibration thereof is not passed and the defects of the Parts should be re-measured or results of the last borescopic inspection should be amended again;

the calibration formula is:

$$\frac{d_n - d_p}{d_p} \geq \delta$$

wherein, $d_n$ indicates data of defects in the present inspection measurement;

$d_p$ indicates data of defects in the last inspection measurement;

$\delta$ indicates an error threshold permitted in the measurement of defects, generally in the range of −8% to −5%;

comparing with the repetitive inspection interval recommended in the results of the present borescopic inspection with that of the last inspection results, if the recommended repetitive inspection interval, which is input by the present inspection, is larger than the repetitive inspection interval, which is input the last time, workers are reminded of calibrating the conclusion of the present repetitive inspection results.

In a further step, in the above-mentioned method, the method further comprises data storage, wherein the data include photos taken when checking whether defects occur on the equipment with a borescope, and the photos are stored in two forms, respectively being an original photo or a compressed photo.

In a further step, in the above-mentioned method, the method further comprises the record exhibition which means exhibiting the previously input data during the consultation.

The present invention also discloses a system of recording data from the borescopic inspection meaning checking whether defects occur in the equipment consisting of components with a borescope, the system comprising:

1) a component hierarchical structure model used for constructing the component hierarchical structure of the equipment, wherein the component hierarchical structure comprises two levels of Module and Part, and the Module comprising one or more Part(s);

2) a general description model used for defining defects that may occur on the Part(s) and defining the general description template comprising three sections of Type, Position and Size, wherein the Type means defining the defects, the Position means determining the position where the defects are located on the Parts and the Size means defining the dimensions of the defects;

3) an evaluation model comprising the evaluation template used for recording inspection results on the Part(s), wherein if defects occur in the inspection results on the Part(s), the evaluation template needs to record the following information: the inspection results of defects, the recommendations and the trend of defects;

4) a Module defect conclusion model used for concluding defects on the Module so as to define the conclusion template of defects on the Module, wherein the defining the conclusion template of defects on the Module includes defining the primary types of defects to be concluded, the subtypes of defects and dimensions of defects;

5) a standardization input model of the borescopic inspection results used for standardizing the input of data from the borescopic inspection, wherein the data from the borescopic inspection comprise:

following information of one Part:
(1) information input into the general description template;
(2) information input into the evaluation template;
(3) information input into the conclusion template of defects on Modules; following information of another Part:
(1) information input into the general description template;
(2) information input into the evaluation template;
(3) information input into the conclusion template of defects on Modules; until finishing input of information of borescopic inspection on all the Parts;

6) a data calibrating model used for calibrating input data and comparing the input data from the borescopic inspection with historical data in a database;

7) a data storage model used for storing the input data, wherein the data comprise photos taken when checking whether defects occur on the equipment with a borescope, and the photos are an original photo or an compressed photo;

8) a record exhibition model used for exhibiting the previous input data during consultation.

Beneficial Effects

It can be known through analysis that the present invention discloses a method and a system of recording data from the borescopic inspection and it mainly realizes the following technical effect: the method in the present invention can be directly applied to the operation system of the borescopic equipment and finish the report directly while conducting the borescopic inspection; it can also act as independent data collection software that standardizing the input of the borescopic inspection results completed on the computer or tablet computer by workers. Standardizing the input of results provides sustainable and stable data source for researches on the trend of defects on Parts subjected to the borescopic inspection, recognition of defected figures and the intervals of the borescopic inspection. The present invention provides an excellent measurement method of improving the reliability of modular mechanical products through quantizing the overall trend of the internal defects.

BRIEF DESCRIPTION OF THE DRAWINGS

FIG. 3 shows a substantive description manner chart of the Nick inspection results of Stg. 8 High Pressure Compressor blade in the CFM56-7B engine;

FIG. 4 shows an introduction chart of defects that may occur on HPC (Module)>HPC Blades (Sub Module)>Stage 1 HPC blades (Part) within CFM56-7B engine;

FIG. 5 shows a conventional defect chart for the Borescopic Inspection within the Aircraft Engine.

DETAILED DESCRIPTION OF THE EMBODIMENTS

Now the present invention will be described in details in combination with the embodiments. Examples are provided by way of describing the present invention rather than limiting the present invention. Actually, a person skilled in the art will know that the present invention can be amended and modified as long as the present invention does not depart from its scope or spirit. For example, Part of features shown or described as one embodiment can be used in another embodiment so as to generate another example. Therefore, the present involves such amendments and modifications within the scope defined by the appended claims and the equivalents thereof.

According to embodiments of the present invention, it provides a method and a system of recording data from the borescopic inspection, which can standardize the storage of images, video and words of the inner Parts or defects to the Part(s) of the aircraft engine and the gas turbine machine.

A method and a system of recording data from the borescopic inspection meaning checking whether defects occur in the equipment using a borescope, the equipment consisting of components and the method comprising the following steps:

Step 1: constructing the hierarchical structure of Parts within the equipment.

The hierarchical structure of Parts can include two levels of Module and Part successively, the Module comprising one or more Part(s). Moreover, Module can comprise Sub Modules and Part can comprise Sub Parts, wherein Module, Sub Module, Part and Sub Part present as four levels and the inclusion relation is Module⊇Sub Module⊇Part⊇Sub Part.

Commonly speaking, the engine consists of five Modules, i.e. a low pressure compressor, a high pressure compressor, a combustion chamber, a high pressure turbine and a low pressure turbine. As specific designs and structures for different types of engine are not entirely the same, an universal standardizing method is required to establish the hierarchical structure for each type of engine. The hierarchical structure of Parts used for the borescopic inspection from Module to Sub Part within the engine is constructed based on the textual specification to the borescopic inspection for the engine in the Aircraft Maintenance Manual (AMM) for each plane.

Figure 1:
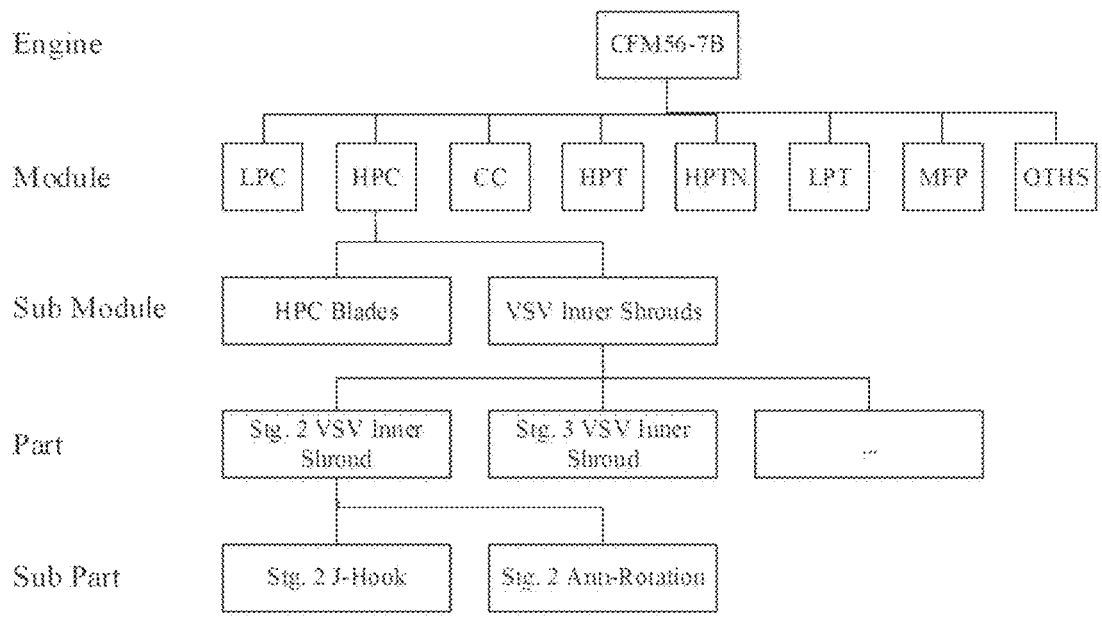
FIG. 1 shows a hierarchical structure chart of CFM56-7B engine.

For example, the hierarchical structure of CFM56-7B engine can be substantively shown in FIG. 1.

Wherein:

Modules comprise: LPC (Low Pressure Compressor), HPC (High Pressure Compressor), CC (Combustion Chamber), HPT (High Pressure Turbine), HPTN (High Pressure Turbine Nozzle Guide Vine), LPT (Low Pressure Turbine), MFP (Main Fuel Pump) and OTHS (Others);

Sub Modules of Module HPC comprise: HPC Blades (High Pressure Compressor Blades) and VSV Inner Shrouds (Variable Stator Vane Inner Shrouds);

Parts within Sub Module VSV Inner Shrouds comprise: Stg. 2 VSV Inner Shroud and Stg. 3 VSV Inner Shroud;

Sub Parts within Part Stg. 2 VSV Inner Shroud comprise: Stg. 2 J-Hook and Stg. 2 Anti-Rotation.

Step 2: defining the general description template of defects.

Step 2.1: defining defects that may occur on the Parts. The Parts herein mean Part and Sub Part.

Defects specifically include: Normal, Crack, Missing Material, Tear, Nick, Scratch, Dent, Curl and Bend etc., wherein the specific defect list can be referred to Appendix I: Conventional Defect List for the Borescopic Inspection within the Aircraft Engine.

Aircraft Maintenance Manual will explicitly define defects that may occur in each component within each type of engines and data that needs to be collected after defects occurred, by which means the construction of the hierarchical structure of components for the borescopic inspection can be realized based on related literatures such as the Aircraft Maintenance Manual.

Defects that may occur in each component within each type of engines and data that needs to be collected after defects occurred are defined, by which means the general description template of defects to each component within the engine can be constructed.

For example, defects that may occur on HPC (Module) >HPC Blades (Sub Module)>Stage 1 HPC blades (Part) within CFM56-7B engine are shown in FIG. 4.

Step 2.2. Defining the general description template.

The general description template includes a Type, a Position and a Size, wherein Type means defining the defects, Position means defining the specific location of the defects and the Size means defining dimensions of defects; the complete description of defects is realized by the Type, the Position and the Size.

As the aircraft engine is a highly sophisticated and precise thermal mechanism and the working environment and the bearing load for different Modules are not the same, defects that may occur in different components and data that need to be collected for defects in different components are not the same, in addition to that requirements that occur in different components in Aircraft Maintenance Manual are not the same, a general description template of defects needs to be established to describe defects that may occur in the hierarchical structure within each component.

The updating and maintaining of Type, Position and Size information of all defects are realized through the description template.

Firstly, the specific meaning of Type needs to be specified. Type means defining defects, i.e. offering the specific types of defects. In order to ensure an accurate description for the defect types, the types of defects need to be further refined; as exemplified by Crack, the present method adopts methods of Type 1, Type 2 and Type 3 for defining the types of defects.

Type 1 is the primitive type. The primitive type is Crack. As different subtypes of defects under the identical type may occur on different components within an engine, Crack under Type 1 can be divided into subtypes such as Axial Crack, Radial Crack and Circumferential Crack etc.

Type 2 is the secondary type. Under certain circumstances, one type of defects may result from the continuous deterioration of another type of defects; or one type of defects may simultaneously be accompanied with another type of slight defects, which function is realized mainly this field of Type 2, the secondary type. For example, specific to Crack, the secondary type includes Related to Tear and Related to Nick etc.

Type 3 is the Remark. As the internal structure of the engine is sophisticated and Type 1 (primitive type) and Type 2 (secondary type) are not enough to provide a complete definition to the types of defects, a Remark is needed; for example, specific to Crack, the Remark includes Connect to Combustion Holes and Extend Radially to The Blade Tip etc.

What needs to figure out is that the definition method of three levels mentioned in the present step, i.e. Type 1, Type 2 and Type 3, can be further extended to more levels; the multi-level definition mentioned in the present step aims at adopting a method that is in priority order, classified and can be identified and utilized directly by machines for describing the types of defects in detail.

Secondly, the specific meaning of Position should be explained. Position means determining where defects are located on the components. As the geometry structure of the components within the engine is commonly very sophisticated, where the defect is located on the components should be ascertained. Defects occurring in other Parts apart from the blade within the engine should be positioned in a manner of Position 1-Position 2-Location (or First position-Second position-Location). When defects occur to the blade, where defects are located on the Part should define in a manner of Airfoil-Position 1-Position 2-Location, wherein:

Airfoil: determining where defects are located on the blade, such as Leading Edge, Trailing Edge, Convex Surface and Concave Surface etc.

Position 1 (First position): determining the area where defects are located on the Parts. Commonly speaking, specific to big Parts, areas where Parts are located, such as area A and area B, are defined at the beginning of Part(s) design.

Position 2 (Second position): as areas where defects are located in some Parts cannot be accurately described merely by Position 1, a descriptive definition to the areas should be supplemented. The specific definition contents should be ascertained based on the positions where the Parts are located and the description of the areas where defects are located in the very place from Aircraft Maintenance Manual.

Location: determining the position of defects through specific numerical measurements. The specific implementation methods are: firstly defining the reference position of measurements and/or the starting point of measurements, then defining types of values, lastly defining the unit of values; for example, the location where Crack occurs on the blade can be shown as:

Reference: From Leading Edge
Value Type: Float
Unit: mm

Namely, if Crack occurs on the blade, optional items for defining the positions are: the distance of Crack from leading edge, the type of input number is float and the unit of the distance is millimeter.

Again, the specific meaning of Size should be explained. Size means defining the dimensions of defects. After defects occur on the aircraft engine, dimensions of defects should be measured based on Aircraft Maintenance Manual provided by manufacturers and corresponding maintenance measurements should be made according to dimensions of defects. Implementation methods of measurements on dimensions are: firstly defining names of defects to be measured, then defining types of the collected values, lastly defining the unit of values; for example, dimensions of Crack on the blade can be shown as:

Nomenclature: The Max Length
Value Type: Float
Unit: mm

Namely, if Crack occurs on the blade, optional items for dimensions of measurement are: the max length, the type of the input number is float and the unit of the length is millimeter.

Step 2.3: regulating Type, Position and Size information of specific defects occurring on specific Parts.

Defects defined in step 2.1 and data to be collected for defects and defined in step 2.2 are defined for circumstances that may occur on all places in all types of engines; in order to improve the efficiency of recording and collecting information and alleviate the work load of recording staffs, specific defects on specific Parts should be defined:

For example, defects on CFM56-7B engine characterized by HPC>HPC Blades>Stage 1 HPC Blades>Crack can be defined as:

| | | |
|---|---|---|
| Type | Type 1* | Chord-Wise Crack |
| | | Radial Crack |
| | Type 2 | N/A |
| | Type 3 | FROM THE TIP |
| Position | Airfoil | Leading Edge |
| | | Trailing Edge |
| | Position 1 | Tip |
| | | Platform |
| | Position 2 | N/A |
| | Location | Ref: From Leading Edge, Type: Float, Unit: mm |
| | | Ref: From Trailing Edge, Type: Float, Unit: mm |
| | | Ref: From Tip, Type: Float, Unit: mm |
| | | Ref: From Platform, Type: Float, Unit: mm |
| Size | Nomenclature: The Max Length, Type: Float, Unit: mm* | |
| | Nomenclature: Crack Number On This Blade, Type: Int, Unit: ea | |
| | Nomenclature: Damaged Blade Number, Type: Int, Unit: ea* | |

Wherein, field marked with * means not null, i.e. the recoding staffs must input information marked with *, and other fields can be filled in according to the actual situations.

Key defect data that is related to the reliability of the Parts within the engine and may exert great influence on the intervals of the repetitive inspection with a borescope in the borescopic inspection can be defined as required fields; in a standardized recording step, the required field must be marked with *; if the required fields are null, then they are not permitted to be submitted.

What needs to figure out is that the required fields for different defects of different components are not the same and this method defines the required fields of defects on each component through the present step.

Step 3: defining the evaluation template of inspection results on the Parts.

The evaluation template includes recording inspection information of the Parts. If defects found during Parts inspection, the evaluation template shall record the following information:

| fields | Description |
| --- | --- |
| Result | options of inspection results include: Accept with No Further Action Required, Accept with Continue BSI Interval, Accept with Reduced BSI Interval, Accept with CIS Limit, Reject, To Be Determined |
| Recommendations | Recommendations: Flight hours and/or cycles before the next repetitive inspection, hours and/or cycles of continue in service |
| Trend | optional items for trend of defects include: New Finding, The Same and Propagated |
| Reference | evaluation results reference |
| Remarks | Supplementary instruction |

If no defects are found during Parts inspection (namely the inspection result is Normal), on which circumstance the recording staffs only need to fill in the Remarks in the Remarks fields of the evaluation template.

Wherein, field descriptions of the inspection results of defects include:

Accept with No Further Action Required which means that no further action are needed as defects occurring on the Parts are in a small level;

Accept with Continue BSI Interval which means that repetitive inspection standards identical to those of the last borescopic inspection are adopted as defects occur on the Parts do not prominently deteriorate and standards of shortening the borescopic inspection is not yet met as compared with results of the last borescopic inspection;

Accept with Reduced BSI Interval which means that the interval of the repetitive borescope inspection needs to be shortened as the defects occurring on the Parts further deteriorate compared to the defect of the last borescopic inspection;

Accept with CIS Limit which means Engine Removal should be completed within flight cycles/hours stipulated by Aircraft Maintenance Manual as serious defects occur thereon and dimensions of defects meet the Engine Removal time limit standards stipulated in Aircraft Maintenance Manual; Reject which means Engine Removal should be completed immediately as serious defects occur thereon and go beyond the permitted defect size scope;

To be Determined which means that the inspection results are underdetermined and need to be further determined with the manufacture of the equipment as the situation of defects occurring on the Parts is sophisticated and a corresponding conclusion cannot be made according to current existing standards.

Step 4: defining the conclusion template of defects on Module in the borescopic inspection.

Module is the largest layer in the hierarchical structure of the components within the engine in the borescopic inspection.

According to requirements on some types of engines from Aircraft Maintenance Manual, when defects occur on some Parts of Modules, defects on the overall Modules should be concluded, for which reason the conclusion template of defects on Modules should be established.

The conclusion template of defects on Modules is implemented as: Firstly defining types of defects to be concluded, then defining subtypes of defects and lastly defining the dimensions of measurements, i.e.

Firstly, selecting types of defects to be concluded by using the common template of defects in step 2;

Then, selecting subtypes of defects in Type of step 2 according to the determined types of defects.

Lastly, defining the dimensions of measurements in Size of step 2 according to the determined types of defects.

For example, the conclusion template of defects on Modules of HPC within CFM56-7B engine is:

Type: Crack

Primary Type: Radial Tip Crack, Chord-Wise Crack From The Tip

Size: Nomenclature: Stg.5 Thru 9 Damaged Blades, Type: Int, Unit: ea

Step 5: standardizing the input of results in the borescopic inspection.

Standardizing the input of data from the borescopic inspection specifically comprises:

the following information of one Part:
1) the information input into the general description template;
2) the information input into the evaluation template;
3) the information input into the conclusion template of defects on Modules; the following information of another Part:

the information repeatedly from 1), 2), 3);

until all records of borescopic inspection on Parts are finished.

When the equipment is an aircraft engine or a gas turbine, data from the borescopic inspection that is input by standardization further includes basic information of the engine; andengine ID plate.

Recording the defect information of Parts within the engine and evaluating the defect results and filling the conclusion information of Module according to the definition of the conclusion template of defects on Module in step 4; concluding based on the borescopic inspection results.

Standardizing the input of the borescopic inspection results is conducted according to the following steps:

Step 5.1: collecting basic information of the engine including the engine installation information, the working basis and the borescopic equipment etc, which will be recorded by the workers. The basic information of the engine is listed and shown in fields from the following table in detail:

| fields | description |
| --- | --- |
| Fleet | determining engine's belonging airlines and aircraft's operational base |
| Borescope | recording the information of the equipment conducting the borescopic inspection |

-continued

| fields | description |
| --- | --- |
| ESN | the engine serial number |
| A/C Reg. Pos | the position where the engine is located in the plane |
| Base | aircraft's operational base |
| Engine Configuration | the engine configuration |
| TSN/CSN | Time Since New/Cycle Since New |
| TSR/CSR | Time Since Repair/Cycle Since Repair |
| BSI Data | the borescopic inspection data |
| Task Card/NRC/EO | job card/nonroutine job card/engineering order number on which basis the borescopic inspection is conducted. |
| Reason | The reason why the borescopic inspection is initiated |
| Content | Module or special places involved in the borescopic inspection |

What needs to figure out is that the basic information of the engine mentioned in step 5.1 is not limited to the fields mentioned in the above-mentioned detail information and workers may add other field information according to the demands in the actual work.

Step 5.2 recording the engine ID plate, which records the serial number of the engine, type, thrust and configuration etc. By shooting engine ID plate, the engine subjected to the present borescopic inspection can be confirmed.

Step 5.3 recording the defect information of Parts within the engine and evaluating the defect results, i.e.:
1) input information into the general description template; and
2) input information into the evaluation template:
wherein, recording the defect information of the engine according to the definition of defects in step 2.1 and evaluating the defect results according to the evaluation template in step 3.

Figure 2:
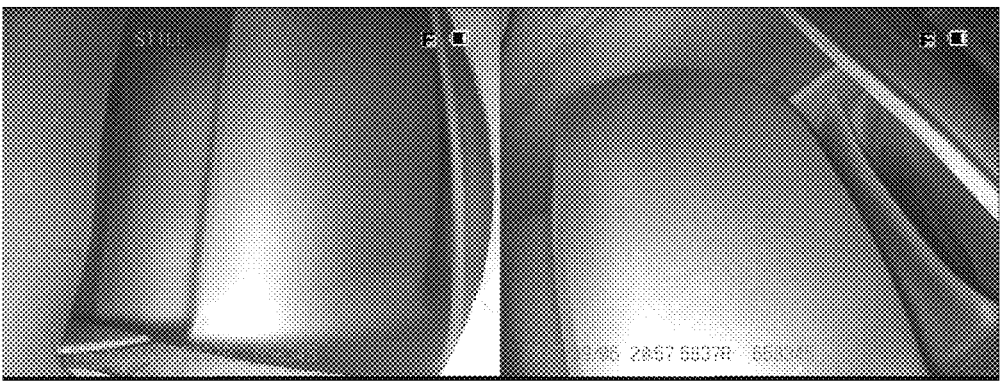
FIG. 2 shows a substantive description manner chart of the normal inspection result of Stg. 4 High Pressure Compressor Blade in CFM56-7B engine.

If no defects are found in Parts inspection, the examiner can merely select Normal from the inspection results and upload the photo of the borescopic inspection in corresponding position; for example, if the inspection result of Stg. 4 High Pressure Compressor Blade in CFM56-7B engine is normal, the substantive description manner thereof is shown in FIG. 2.

If defects are found in the inspection, the defects should be described according to the contents in step 2 and step 3 and the photo of the borescopic inspection in the corresponding position should be uploaded; for example, if the inspection results of Stg. 8 High Pressure Compressor blade in the CFM56-7B engine is Nick, the substantive description manner thereof shown in FIG. 3.

Step 5.4: filling the conclusion information of Module according to the definition to the conclusion template of defects on Module in step 4, i.e.:
3) input information the conclusion template of defects on Module;

Step 5.5: repeating step 5.3 and 5.4 until all the records of the borescopic inspection on the Parts are completed;

What needs to figure out is that the present method provides the addition, deletion and folding/unfolding button following the records of each information in consideration of the convenience of the recording manner; the inspection results of the overall Parts can be folded/unfolded through the folding/unfolding button.

Actually, during borescopic inspection, the phenomenon that various defects occur simultaneously in an identical position within the Parts may happen, for which reason the present method defines the item of Combined Defect that the combined defect can be described and various defects can be put in one identical place. The specific implementation method is shown in the following chart:

| Module: LPC Record 1: LPC > LPC STG. 2-4 BOOSTER BLADES > STAGE 2 BOOSTER BLADES > CRACK, DENT | | | |
| --- | --- | --- | --- |
| CRACK | | DENT | |
| Type: | RADIAL CRACK | Position: | LEADING EDGE, AERA E |
| Position: | AERA G | | FROM TIP: MM |
| | FROM TIP: MM | | FROM PLATFORM: MM |
| | FROM PLATFORM: MM | | FROM LEADING EDGE: MM |
| Size/Dimension: | MAX LENGTH: MM | | FROM TRAILING EDGE: MM |
| | DAMAGE BLADES: EA | Size: | THE DEPTH: MM |
| | | | THE WIDTH: MM |
| | | | DEFECTS ON BLADES: EA |
| | | | DAMAGED BLADES: EA |
| Result: | Please select | | Trend: Please select |
| RCMD: | XXX Cycles/XXX Hours | | |
| Reference: | Please select Revision: | | |
| Remarks: | | | |
| (AddBSI Pictures) | | | |

Step 5.6: concluding according to the results of the borescopic inspection

The conclusion mainly includes the follow several kinds:
For the Parts whose inspection results are all normal within Module, the automatically produced inspection results of Module is normal;

The Parts with following inspection results are added to the conclusion automatically: shortening the interval of borescopic repetitive inspection according to Aircraft Maintenance Manual as defects occurring in the Parts are further deteriorated compared with the last borescopic inspection (Accept with Reduced BSI Interval); The engine should be removed within a stipulated time (limited flight cycles/hours) according to Aircraft Maintenance Manual as serious defects occur on the Parts and the dimensions of defects reach the engine removal standards (Accept with CIS Limit); an immediate Engine Removal is needed as serious defects occurring on the Parts go beyond permitted limit by Aircraft Maintenance Manual (Reject); and the inspection results are to be determined and need to be further ascertained with the manufacturer as the situation of defects occurring on the Parts is sophisticated and a corresponding conclusion cannot provided according Aircraft Maintenance Manual (To Be Determined);

The workers can add the Parts with the following inspection results into the conclusion as appropriate: no further Action are required as defects occurring on the Parts are in a low level (Accept with No Further Action Required) and the repetitive borescopic inspection interval is the same of last borescopic inspection as defects occurring on the Parts are not prominently deteriorated compared with the results of the last borescopic inspection and the standards of shorten the interval of borescopic inspection required by Aircraft Maintenance Manual is not met (Accept with Continue BSI Interval).

For example, results of one borescopic inspection on the CFM56-7B engine are:
CC Result: Normal
HPTNGV Result: Record 1 CONVAVE SURFACES OF HPTN>BURN, CRACK
Accept with No Further Action Required
Record 2 OUTER PLATFORM>BURN THROUGH
Accept with Continue BSI Interval 400 Cycles, Hours
Record 3CONVEXSURPACES OF HPTN>CRACK
Accept with Continue BSI Interval 800 Cycles, Hours
HPT Result: Record 1 LEADING EDGES OF HPT>MISSING MATERIAL
Accept with No Further Action Required
Remarks:
Step 6: data calibration According to the common rule of the defect variation, the defect, from its appearance, is a process of continuously deteriorating or maintaining the same before the engine is removed and repaired; therefore, the present method will verify the recorded data from the workers and the specific implementation procedures are:

Step 6.1: comparing the basic information (including engine serial number etc.) of the engine recorded by the workers, Parts and defects with the historical data from the database.

Step 6.2: if record information of defects on the Parts within the engine does not exist in the database after search, the present inspection record is directly stored in the database;

Step 6.3: if description of defects on the Parts within the engine already exists in the database after search, the input page will remind the input workers of results of the last borescopic inspection of defects on the Parts. The input workers can click to check the details of the last borescopic inspection so as to make a better judgment on the defects;

Step 6.4: if record information of defects on the Parts within the engine already exists in the database after search, the present record and the historical record should be calibrated, wherein the description of defects cannot be submitted if the calibration thereof is not passed and an inspector should re-measure the defect of the present part or results of the last borescopic inspection should be amended again; the calibration formula is:

$$\frac{d_n - d_p}{d_p} \geq \delta$$

wherein, $d_n$ indicates data of defects in the present inspection measurement;
$d_p$ indicates data of defects in the last inspection and measurement
$\delta$ indicates the error threshold permitted in the defect measurement and the common value range is −8%~−5%;

Step 6.5: comparing with the repetitive inspection interval recommended in the results of the present borescopic inspection with that of the last inspection results, if the recommended repetitive inspection interval, which is input by the present inspection, is larger than the repetitive inspection interval, which is input the last time, then remaindering workers of calibrating the conclusion of the present repetitive inspection results.

Besides, considering the importance of the borescopic inspection on the engine, procedures in the present method forbids the same worker to conduct consecutive two borescopic inspections on the same part within an engine for the sake of avoiding human errors.

After the worker input engine serial number and select Module to be checked, it will automatically search eligible results of the last borescopic inspection on the engine from the historical database and reminder the worker of checking results of the last the borescopic inspection and getting information of defects on the engine, which can avoid ignoring defects during the present borescopic inspection.

Step 7: data storage

The data include photos shot when checking whether defects occur on the equipment with a borescope, wherein the photo is stored in two forms, respectively being the original image (the original photo) and compressed image (the compressed picture).

As the dimensions of the original photos shot by the industrial borescopic equipment is often big, dimensions of the original photos need to be compressed; when in a preview or consulting mode, the compressed picture can be directly called. If a detailed research on defects is needed, an original image can be called so as to obtain higher sharpness.

Step 8: the exhibition of records

All previously input data can be exhibited when consulting the record.

Corresponding to the above-mentioned method, the present invention also discloses a system of recording the data from the borescopic inspection which checks whether defects occur in the equipment with a borescope. The equipment consists of components and system comprises:

1) a component hierarchical structure model used for constructing the component hierarchical structure of the equipment, wherein the component hierarchical structure includes two levels of Module and Part, the Module comprising one or more Part(s).

2) a general description model used for defining defects that may occur on the Parts and defining the general description template;

The general description template comprises three sections, i.e. Type, Position and Size, Type means defining the defects, Position means determining the position where the defects are located on the Parts and Size means defining the dimensions of the defects;

3) an evaluation model comprising the evaluation template and used for recording the inspection results on the Parts. If defects occur in the inspection results on the Parts, the evaluation template needs to record the following information: the inspection results of defects, the recommendation and the trend of defects;

4) a Module defect conclusion model used for concluding defects on Module so as to define the conclusion template of defects on Module, wherein defining the conclusion template of defects on Module includes defining the major types of defects to be concluded, the subtypes of defects and dimensions of defects;

5) a standardization input model of the borescopic inspection results used for standardizing the input of data from the borescopic inspection, wherein data from the borescopic inspection includes:
the following information of one Part:
(1) the information input into the general description template;
(2) the information input into the evaluation template;
(3) the information input into the conclusion template of defects on Modules; the following information of another Part:
is the information repeatedly from (1), (2), (3),
until all records of borescopic inspection on Parts are finished.
6) a data calibration model used for calibrating the input data and comparing the input data from the borescopic inspection with the historical data in the database;
7) a data storage model used for storing the input data, wherein the data include photos shot during the check whether defects occur on the equipment with a borescope and the photo is the original photo or the compressed photo;
8) a record exhibition model used for exhibiting the previous input data in a need of consult.

The analysis and implementation thoughts of the method in the present invention is obviously not limited to the problem of standardizing the input of results from the borescopic inspection on the engine and it can also make adaptive adjustments on the target object of the borescopic inspection; specific to modular mechanical products, they are disassembled to the most inner Parts and then defects in their Parts and Module stage are defined, followed by matching the collected data with the relative standards.

The method in the present invention can be directly used in the operation system in the borescopic equipment and can directly complete the borescopic inspection report while conducting the borescopic inspection; it can also act as independent data collection software that standardizing the input of the borescopic inspection results completed on the computer or tablet computer by workers. Standardizing the input of results provides sustainable and stable data source for researches on the trend of defects on Parts subjected to the borescopic inspection, recognition of defected figures and the intervals of the borescopic inspection. The present invention provides an excellent measurement method of improving the reliability of modular mechanical products through quantizing the overall trend of the internal defects.

What set forth are merely the preferred embodiments of the present invention and they are not for limiting the present invention. For a person skilled in the art, the present invention can have various modifications and changes. Any amendments, equivalent replacements and improvements etc. within the spirit and principles of the present invention shall all be contained in the protection scope of the present invention.

The invention claimed is:
1. A method, comprising:
creating, in a non-transitory computer-readable medium using a computer,
a hierarchical data structure reflecting components in a piece of equipment including at least a module and a part, the module comprising one or more of the parts, the hierarchy of the data structure reflecting the physical organization of the components in the piece of equipment,
a general description template for defects,
an evaluation template for inspection results of the one or more parts, and
a conclusion template for the defects on the module;
storing first data from a first borescopic inspection in a database using comprised of and according to the hierarchical data structure and the general description template, the evaluation template, and the conclusion template, the data including first standardization information;
receiving second data from a second borescopic inspection, the second data including second standardization information;
searching the database for a match to the second standardization information based on the first standardization information; and
based on a result of said searching
storing the second data from the second borescopic inspection in the database according to the hierarchical data structure and the general description template, the evaluation template, and the conclusion template, or
determining, based on said searching, that the first borescopic inspection and the second borescopic inspection are both of the same one or more parts and calibrating the first borescopic inspection with the second borescopic inspection using the formula:

$$\frac{d_n - d_p}{d_p} \geq \delta$$

in which $d_n$ indicates data of defects in the second borescopic inspection, $d_p$ indicates data of defects in the first borescopic inspection, and $\delta$ indicates an error threshold permitted in the measurement of defects, and
accepting or rejecting the data of defects in the second data from the second borescopic inspection or causing or allowing a user to repeat the second borescopic inspection or amend the data of defects in the second data from the second borescopic inspection based on a result of said calibrating.

2. The method of claim 1, wherein the general description template for the defects comprises:
a type defining a defect type;
a position defining a defect position on the one or more parts; and
a size defining defect size.

3. The method of claim 2, wherein the type comprises primary type, secondary type, and remark.

4. The method of claim 3, wherein defining the conclusion template of the module comprises defining the primary types of defects to be concluded, defining the subtypes of the defects, and defining dimensions of the defects.

5. The method of claim 2, wherein the position comprises position and location.

6. The method of claim 1, the evaluation template comprising inspection results, recommendations, and defect trends.

7. The method of claim 6, wherein the inspection results comprise a result set including:
(a) no further action is required as the defects occurring on the one or more parts are at a low level;
(b) a repetitive inspection standard identical to that of the last borescopic inspection is adopted as the defects occurring on the one or more parts have not significantly deteriorated as compared with results of the last borescopic inspection and a threshold for shortening a borescopic inspection interval has not yet been met;

(c) the borescopic inspection interval should be shortened as the defects occurring on the one or more parts have deteriorated as compared with the defects of the last borescopic inspection;

(d) the equipment should be removed within a stipulated time as serious defects occur on the one or more parts and dimensions of the defects meet the equipment removal standard;

(e) the equipment needs to be removed immediately as more serious defects occur on the one or more parts and go beyond permitted dimensions for the defects; and (f) the inspection results are undetermined and need to be further determined with the manufacturer of the equipment as the defects occurring on the one or more parts are complex and a corresponding conclusion cannot be drawn according to current existing standards.

8. The method of claim 7, further comprising:
for each of the one or more parts with normal inspection results, automatically setting the inspection result to normal;
for each of the one or more parts with inspection results of (c), (d), (e), and (f), automatically adding the part to the conclusion; and
for each of the one or more parts with inspection results of (a) or (b), adding or not adding the part to the conclusion.

9. The method of claim 6, wherein the recommendations comprise flight hours or cycles before the next repetitive inspection and hours or cycles of continue-in-service.

10. The method of claim 6, wherein the defect trends comprise new finding, the same, and propagated.

11. The method of claim 6, wherein the evaluation template further comprises reference and remarks.

12. The method of claim 1, wherein said storing the first data and said storing the second data further comprise iteratively accepting information input into the general description template, information input into the evaluation template, and information input into the conclusion template for the defects for each of the one or more parts.

13. The method of claim 12, wherein the equipment comprises an aircraft engine or a gas turbine, and the first data and the second data further comprise basic information of the engine and information from an engine ID plate.

14. The method of claim 1, wherein one or both of the first data and the second data include photos taken during the borescopic inspection and one or both of said storing the first data or said storing the second data comprise storing the photos in two forms, an original form and a compressed form.

15. The method of claim 1, further comprising, after said determining, displaying the first data.

16. The method of claim 1, wherein the equipment comprises an aircraft engine or a gas turbine.

17. The method of claim 1, said calibrating further comprising:
comparing an inspection interval recommended in the conclusion of the second borescopic inspection with an inspection interval recommended in the conclusion of the first borescopic inspection, and
reminding workers to check the inspection interval in the conclusion of the second borescopic inspection if the inspection interval in the conclusion of the second borescopic inspection is longer than the inspection interval in the conclusion of the first borescopic inspection.

18. A system for recording data from a borescopic inspection of a piece of equipment, comprising:
a component hierarchical structure model in the form of a set of machine-readable instructions on a non-transitory machine-readable medium that, executed on the machine, create a hierarchical data structure, the hierarchy of the data structure reflecting the physical organization of the components in the piece of equipment, the hierarchical data structure comprising at least one module, the at least one module comprising one or more parts;
a general description model in the form of a set of machine-readable instructions on a non-transitory machine-readable medium that, executed on the machine, create a general description template for defining defects that may occur on the one or more parts, the general description template including a type section, a position section, and a size section, the type section defining types of defects, the position section defining positions of the defects, and the size section defining the dimensions of defects;
an evaluation model in the form of a set of machine-readable instructions on a non-transitory machine-readable medium that, executed on the machine, create an evaluation template to record inspection results on the one or more parts, such that if defects occur on the one or more parts, the evaluation template records the inspection results, recommendations, and defect trends;
a module defect conclusion model in the form of a set of non-transitory machine-readable instructions on a machine-readable medium that, executed by the machine, create a module defect template, the module defect template including primary types of defects, defect subtypes, and defect dimensions;
a standardization input model in the form of a set of non-transitory machine-readable instructions on a machine-readable medium that, executed by the machine, cause or allow the machine to iteratively accept information input into the general description template, information input into the evaluation template, and information input into the conclusion template for the defects for each of the one or more parts;
a data calibration model in the form of a set of non-transitory machine-readable instructions on a machine-readable medium that, executed by the machine, cause or allow the machine to compare input data from the borescopic inspection with historical data in a database in order to determine whether the input data should be accepted, rejected or caused to be amended; and
a data storage model in the form of a set of non-transitory machine-readable instructions on a machine-readable medium that, executed by the machine, cause or allow the machine to store photographic data as an original photo or a compressed photo; and
a record exhibition model in the form of a set of non-transitory machine-readable instructions on a machine-readable medium that, executed by the machine, cause or allow the machine to exhibit the data from the borescopic inspection or the historical data.

19. The system of claim 18, wherein the equipment comprises an aircraft engine or a gas turbine engine.

* * * * *